United States Patent
Takeda et al.

(10) Patent No.: US 7,415,490 B2
(45) Date of Patent: Aug. 19, 2008

(54) DATA STORAGE SYSTEM

(75) Inventors: Kei Takeda, Kawasaki (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 11/325,021

(22) Filed: Jan. 3, 2006

(65) Prior Publication Data

US 2006/0112253 A1    May 25, 2006

Related U.S. Application Data

(63) Continuation of application No. 10/358,975, filed on Feb. 4, 2003, now Pat. No. 7,035,882.

(30) Foreign Application Priority Data

Aug. 1, 2002 (JP) .............................. 2002-224732

(51) Int. Cl.
*G06F 17/30* (2006.01)
(52) U.S. Cl. .................. 707/205; 707/101; 707/102; 707/103 R
(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,491,810 A | 2/1996 | Allen | |
| 6,154,744 A | 11/2000 | Kenner et al. | |
| 6,366,988 B1 | 4/2002 | Skiba et al. | |
| 6,415,300 B1 * | 7/2002 | Liu | ............................ 707/204 |
| 6,526,420 B2 | 2/2003 | Borowsky et al. | |
| 6,675,321 B1 | 1/2004 | Beaven et al. | |
| 6,763,442 B2 | 7/2004 | Arakawa et al. | |
| 6,766,430 B2 | 7/2004 | Arakawa et al. | |
| 6,832,299 B2 | 12/2004 | Shimada et al. | |
| 6,854,034 B1 | 2/2005 | Kitamura et al. | |
| 6,907,498 B2 | 6/2005 | Kitamura et al. | |
| 2002/0056031 A1 | 5/2002 | Skiba et al. | |
| 2003/0139900 A1 | 7/2003 | Robison | |
| 2003/0149695 A1 | 8/2003 | Delaire et al. | |
| 2004/0225662 A1 | 11/2004 | Nojima | |

FOREIGN PATENT DOCUMENTS

WO    WO00/67130    11/2000

* cited by examiner

*Primary Examiner*—Isaac M Woo
(74) *Attorney, Agent, or Firm*—Townsend and Townsend and Crew LLP

(57) ABSTRACT

In a file system in which data is distributively stored on a plurality of volumes in compliance with file storage requests from business applications, the present invention calculates reliability requirements or performance requirements which represent storage requirements for the storage of individual files requested for storage, selects an actual file storage destination volume in accordance with the reliability characteristics or performance characteristics of each volume, and stores file data on the selected storage destination volume. Since the storage requirements are calculated to select a storage destination volume for each file, data storage destination optimization can be achieved on an individual file basis.

1 Claim, 9 Drawing Sheets

FIG. 4

STORAGE REQUIREMENT CALCULATION RULE 181, 410

BUSINESS APPLICATION VERSUS STORAGE REQUIREMENT MAPPING TABLE

| BUSINESS APPLICATION TYPE 411 | RELIABILITY REQUIREMENTS 412 | PERFORMANCE REQUIREMENTS 413 |
|---|---|---|
| BUSINESS APPLICATION A | HIGH | HIGH |
| BUSINESS APPLICATION B | LOW | LOW |
| BUSINESS APPLICATION C | HIGH | LOW |
| BUSINESS APPLICATION D | LOW | HIGH |
| DEFAULT | LOW | LOW |
| --- | | --- |

FIG. 5

STORAGE DESTINATION VOLUME CALCULATION RULE — 182, 510

STORAGE DESTINATION VOLUME VERSUS CHARACTERISTICS MAPPING TABLE

| RELIABILITY REQUIREMENTS (511) | PERFORMANCE REQUIREMENTS (512) | STORAGE DESTINATION VOLUME (513) |
|---|---|---|
| HIGH | HIGH | STORAGE DESTINATION VOLUME 1 |
| LOW | LOW | STORAGE DESTINATION VOLUME 3 |
| HIGH | LOW | STORAGE DESTINATION VOLUME 1 |
| LOW | HIGH | STORAGE DESTINATION VOLUME 2 |
| --- | | --- |

STORAGE DESTINATION VOLUME USAGE PRIORITY DEFINITION TABLE — 520

| STORAGE DESTINATION VOLUME (521) | USAGE PRIORITY LEVEL (522) |
|---|---|
| STORAGE DESTINATION VOLUME 1 | 3 |
| STORAGE DESTINATION VOLUME 2 | 1 |
| STORAGE DESTINATION VOLUME 3 | 2 |
| --- | |

VOLUME TYPE VERSUS CHARACTERISTICS MAPPING TABLE — 530

| MANUFACTURER (531) | VOLUME TYPE (532) | RELIABILITY CHARACTERISTICS (533) | PERFORMANCE CHARACTERISTICS (534) | CAPACITY UNIT PRICE (535) |
|---|---|---|---|---|
| COMPANY A | 0202 | HIGH | HIGH | 100 |
| COMPANY A | 0201 | LOW | LOW | 20 |
| COMPANY B | 0456 | LOW | LOW | 500 |
| DEFAULT | — | LOW | LOW | 100 |
| | --- | | | |

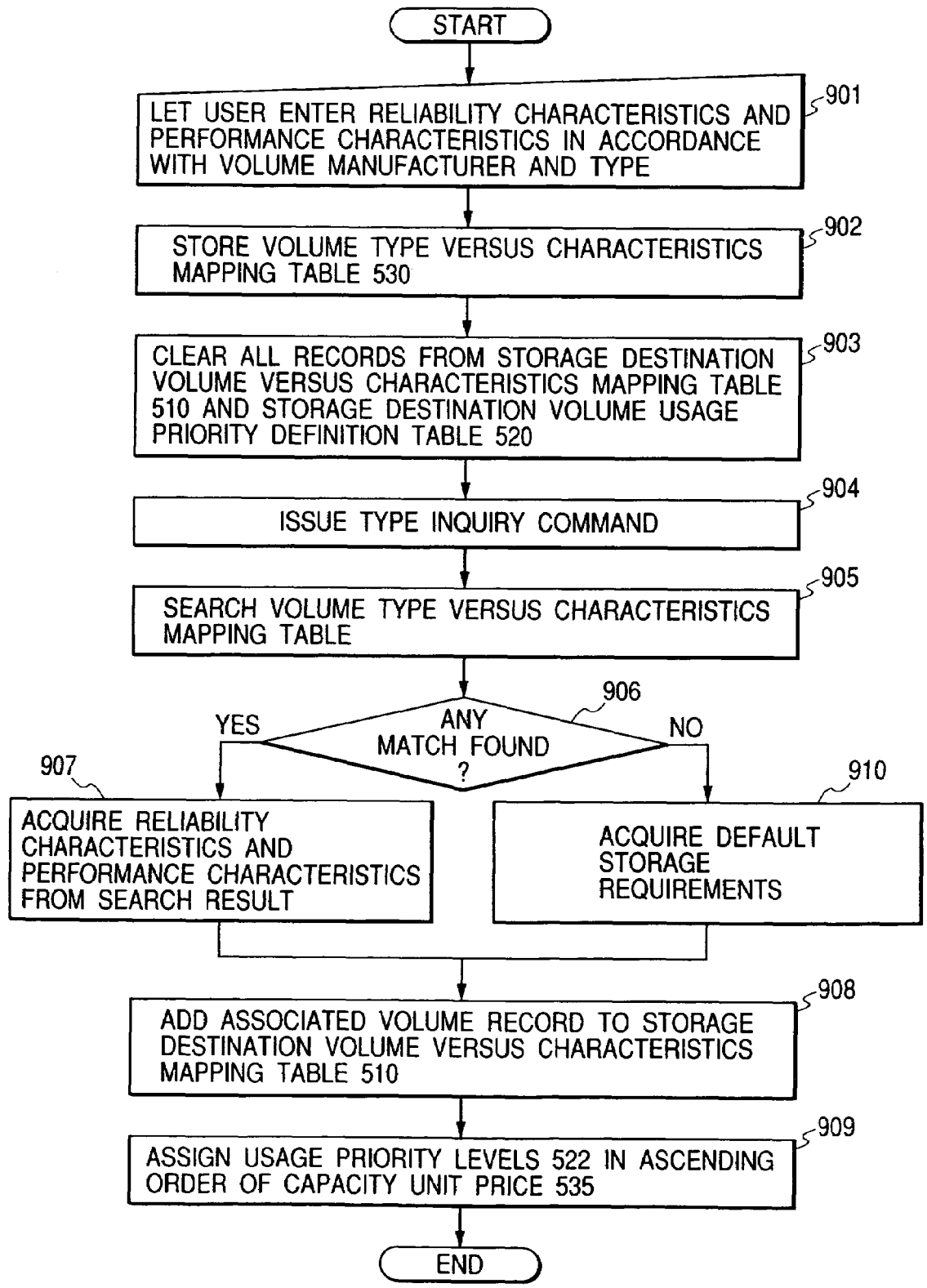

DATA STORAGE SYSTEM

BACKGROUND OF THE INVENTION

1. Field of the Invention

The present invention relates to a data storage system, and more particularly to file storage destination volume selection control that is exercised when files used by a number of business applications are to be stored on volumes in a NAS (Network Attached Storage) system or other file system for distributively storing data on a plurality of volumes.

2. Description of Related Art

It is demanded that storage volumes offer an increased storage capacity in order to handle an increasing amount of data. Further, the important factors for storage devices are reliability characteristics and performance characteristics. The reliability characteristics are determined according, for instance, to the frequency of device failure and the capability for protecting stored data from damage in the event of a failure. The performance characteristics affect the read/write speed for the stored data or the data to be stored. It can be said that these characteristics determine the properties of storage volumes.

Meanwhile, the data to be stored on storage volumes occasionally vary in properties. It is therefore important that a storage volume having optimum reliability characteristics and performance characteristics be selected in accordance with the requirements for the data to be stored. For example, customer data and other mission-critical data should be stored on a highly fault-tolerant volume such as a RAID5 or RAID1 type. Video data, on the other hand, should be stored on a high-speed sequential access volume for effectiveness enhancement purposes.

In the following description, the expression "data storage destination optimization" is used to indicate the act of storing data on a storage volume having optimum reliability characteristics and performance characteristics in accordance with the requirements for the data to be stored.

Conventional data storage destination optimization was basically achieved by an administrator who manually managed the reliability characteristics, performance characteristics, and mount point directory of each volume.

Some large-size disk devices and virtualization products developed in recent years have a data migration function. This function works so that data previously allocated to a certain volume can be later moved to another volume, which differs in reliability characteristics and performance characteristics from the first one. Typical examples of this functionality are the data migration function of a storage subsystem product manufactured by Hitachi, Ltd. and the data migration function of a virtualization product manufactured by Data Core Software Corporation in the U.S.

SUMMARY OF THE INVENTION

However, there are the following problems with the aforementioned conventional methods.

The first problem is that data storage destination optimization cannot be achieved on an individual file basis although it can be accomplished on an individual volume basis. More specifically, the data arrangement cannot be optimized for each file because all the files under the same mount point will be stored on the same volume. Therefore, even if a frequently random accessed file and a frequently sequential accessed file exist in the same directory, they cannot be stored on respective volumes that differ in reliability characteristics and performance characteristics.

The second problem is that a business application manager must be aware of the characteristics and mount point of each volume. As a result, data storage destination optimization cannot be achieved without being aware of the reliability characteristics, performance characteristics, and mount point destination of each physical volume. If, for instance, an index file is to be stored on a high-speed random access storage, a complicated procedure needs to be performed during the use of a conventional technology. More specifically, the use of a conventional technology makes it necessary to locate a high-speed random access volume, mount it in an appropriate directory, and perform setup so that the index file will be stored in that directory.

It is an object of the present invention to provide a data storage system that achieves data storage destination optimization on an individual file basis.

It is a further object of this invention to automatically calculate storage requirements and determine the storage destination volume for data storage destination optimization on an individual file basis, thereby saving a system administrator the trouble of setting a specific volume and its mount destination.

To achieve the above objects, the present invention automatically calculates storage requirements and determines the storage destination volume on an individual file basis. Preferably, the present invention calculates the reliability requirements or performance requirements, which are the storage requirements for file storage, in relation to each file specified by a storage request, selects a storage destination volume in accordance with the calculated storage requirements and the reliability characteristics or performance characteristics of each volume, and stores a file on the selected storage destination volume. Typical information representing the reliability requirements is the mean time between failure and average operating time. Typical information representing the performance requirements is an access speed.

BRIEF DESCRIPTION OF THE DRAWINGS

FIG. 4 illustrates the contents of a storage requirement calculation rule indicated in FIG. 1;

FIG. 5 illustrates the contents of a storage destination volume calculation rule;

FIG. 9 is a flowchart illustrating the processing steps that are performed by a storage destination volume calculation rule setup engine 103.

DETAILED DESCRIPTION OF THE PREFERRED EMBODIMENTS

A preferred embodiment of the present invention will now be described with reference to a NAS system, which is cited as an example of a file system for distributively storing data on a plurality of volumes.

The NAS system cited as an example for the description of the embodiment is simpler than a common NAS system because the former is without irrelevant functions and other details unnecessary for the description of the present invention. However, this description is not necessarily intended to limit the scope of the invention.

Figure 1:
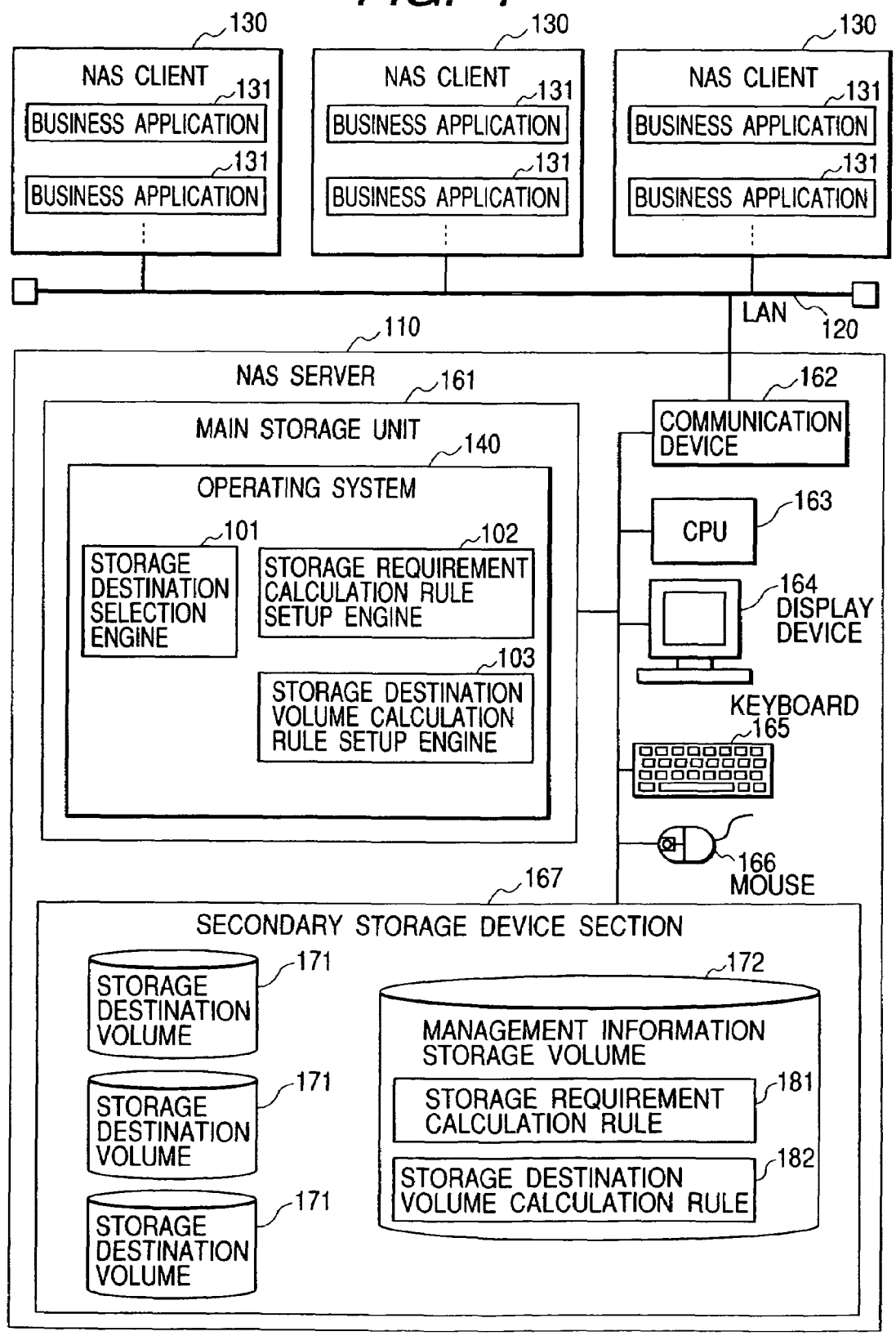
FIG. 1 is a schematic diagram that shows the configuration of a NAS system of a preferred embodiment according to the present invention.

FIG. 1 is a schematic diagram that shows the configuration of a NAS system of a preferred embodiment.

This NAS system includes a NAS server 110, NAS clients 130, and a LAN 120 for connecting the NAS server to the NAS clients.

Within the NAS clients 130 of the preferred embodiment, business applications 131 are executed. The business applications 131 send a file storage request to the NAS server 110 via the LAN 120. The NAS server 110 comprises a main storage device 161, a communication device 162, a CPU 163, a display device 164, a keyboard 165, a mouse 166, and a secondary storage device section 167.

The secondary storage device section 167 comprises two types of volume devices: a plurality of storage destination volumes 171 for storing data for which a storage request may be issued from the NAS clients 130 and a management information storage volume 172 for retaining the NAS server's management information. The management information storage volume 172 stores a storage requirement calculation rule 181 and a storage destination volume calculation rule 182. The main storage device in the NAS server stores an operating system 140.

Within the operating system 140, a storage destination selection engine 101 for selecting a storage destination volume for each file, a storage requirement calculation rule setup engine 102 for setting the storage destination requirement calculation rule 181, and a storage destination volume calculation rule setup engine 103 for setting the storage destination volume calculation rule 182 are executed in compliance with storage requests from the business applications 131 on the NAS clients 130.

The above three engines are stored as program data in the secondary storage device section 167. At system startup, these engines are loaded from the secondary storage device section 167 into the main storage device 161 and executed by the CPU 163.

Although a NAS system for generating file storage requests via a network is described in the preferred embodiment, the present invention is also applicable to a common file system in which the business applications 131 and the storage destination volumes 171 are installed on the same computer.

Figure 2:
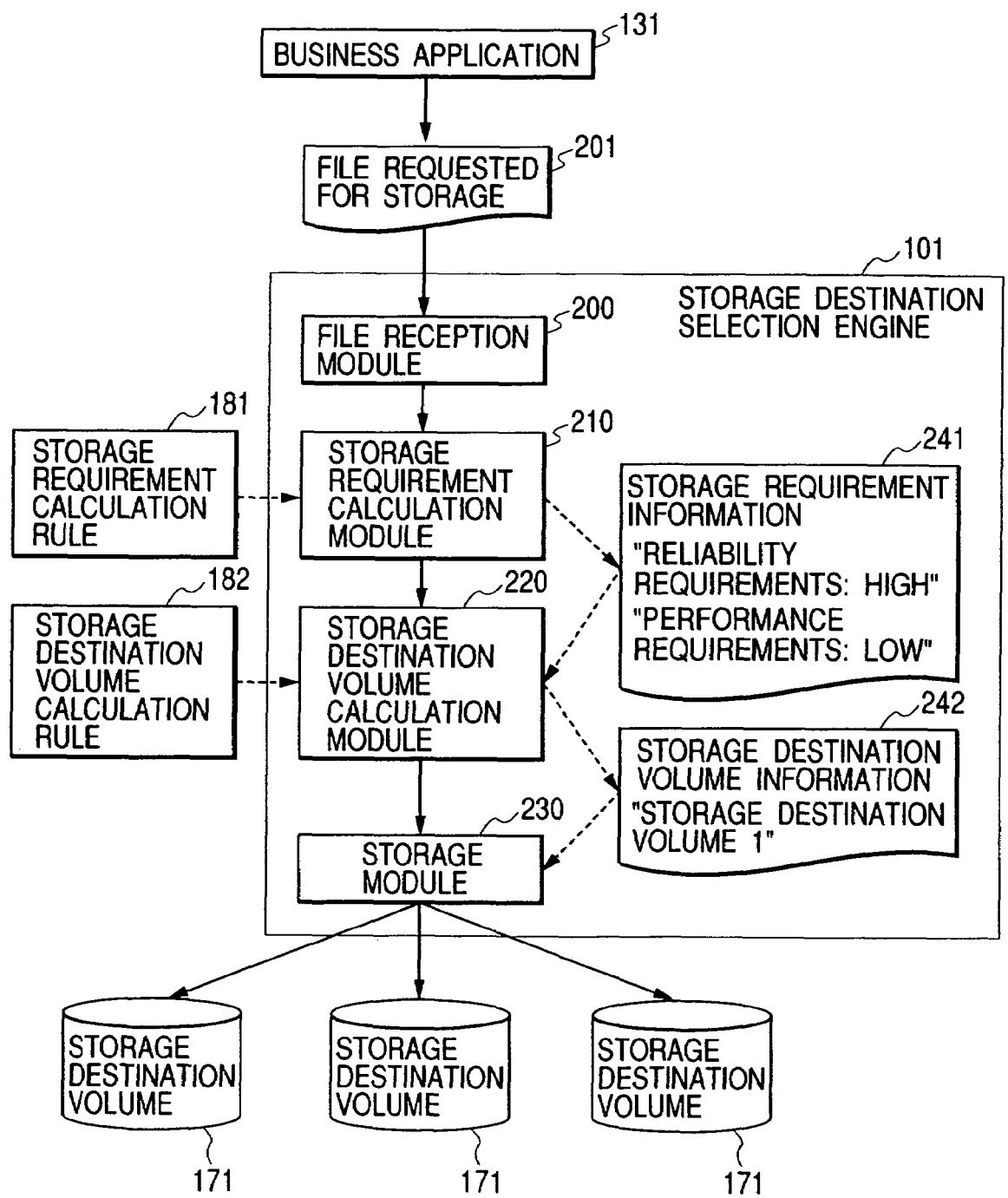
FIG. 2 illustrates the operation of a storage destination selection engine 101 shown in FIG. 1.
Figure 3:
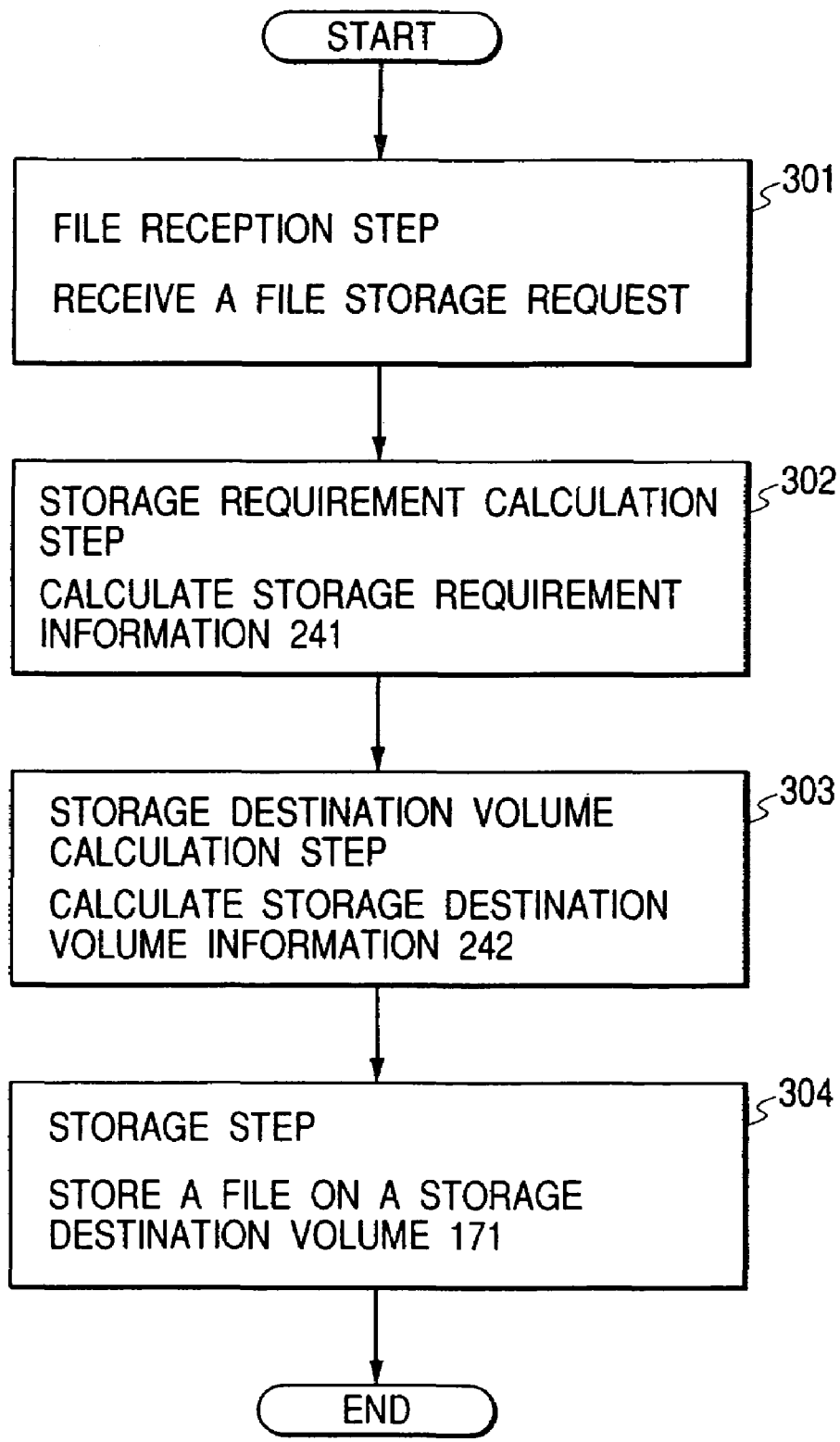
FIG. 3 outlines the flow of a process that is performed by the storage destination selection engine 101 shown in FIG. 1.

FIG. 2 illustrates the operation of the storage destination selection engine 101 of the embodiment. FIG. 3 outlines the flow of a process that is performed by the storage destination selection engine 101 of the embodiment.

The operation and process performed by the storage destination selection engine 101 will be outlined below with reference to FIGS. 2 and 3.

Upon a storage request from a business application 131, a file reception module 200 receives a file requested for storage 201 (file reception step 301).

Next, a storage requirement calculation module 210 references the storage requirement calculation rule 181 and calculates the reliability requirements and performance requirements for the file as storage requirement information 241 (storage requirement calculation step 302).

Next, a storage destination volume calculation module 220 references the storage requirement information 241 and storage destination volume calculation rule 182 and calculates storage destination volume information 242, which designates a specific storage destination volume (storage destination volume calculation step 303).

Finally, a storage module 230 stores the file requested for storage 201 on a storage destination volume 171 that is specified by the storage destination volume information 242, which was determined in the preceding step (storage step 304).

The storage requirement calculation step 302 and storage destination volume calculation step 303, which are among the above processing steps, will now be described in detail.

For the purpose of describing in detail the storage requirement calculation step 302 and storage destination volume calculation step 303, the contents of the storage requirement calculation rule 181 and storage destination volume calculation rule 182 will be described in advance.

FIG. 4 illustrates the contents of the storage requirement calculation rule 181.

The storage requirement calculation rule 181 retains a business application versus storage requirement mapping table 410.

The business application versus storage requirement mapping table 410 calculates the storage requirements for a specific business application related to a storage request, that is, the reliability requirements and performance requirements for a file requested for storage. The use of this table makes it possible to calculate the storage requirements appropriate for the business application characteristics. If, for instance, a database application issues a request for storing a file, this table can conclude that the file needs to be stored on a volume that meets high reliability requirements and high performance requirements.

The business application versus storage requirement mapping table 410 retains reliability requirements 412 and performance requirements 413 for each business application type 411. It is preferred that the mean time between failure, average operating time, RAID configuration (e.g., the RAID1 reliability is higher than that of RAID5), and other parameters be used as the reliability requirements, and that the access speed and other parameters be used as the performance requirements.

The embodiment uses a structure so that the reliability requirements and performance requirements are calculated for each business application type. However, if the contents of column 411 are changed, for instance, to represent an operating system user type or NAS client type instead of a business application type, the storage requirement calculations can be based on a factor other than a business application type.

In the embodiment, the storage requirement calculation rule is predefined. However, the reliability requirements, performance requirements, and other storage requirements may be alternatively set for individual business applications targeted for storage so as to use the storage requirements set for business applications when a storage request is received from business applications.

Although the embodiment assumes only two definable values ("high" and "low") for the reliability requirements 412 and performance requirements 413, various other values, including real values, may be alternatively used in reality instead of the two values ("high" and "low").

FIG. 5 illustrates the contents of the storage destination volume calculation rule 182.

The storage destination volume calculation rule 182 includes a storage destination volume versus characteristics mapping table 510, a storage destination volume usage priority definition table 520, and a volume type versus characteristics mapping table 530.

The storage destination volume versus characteristics mapping table 510 retains the reliability requirements 511 and performance requirements 512 for each storage destination volume 513. When the reliability requirements and performance requirements for a file are used as the key to search this table, a specific storage destination volume can be calculated.

The storage destination volume usage priority definition table 520 is used as an auxiliary for storage destination volume selection. If two or more storage destination volumes are designated as candidates when the file reliability requirements and performance requirements are compared against the storage destination volume versus characteristics mapping table 510, one storage destination volume is selected according to the usage priority defined in the storage destination volume usage priority definition table. This table 520 retains the information about the usage priority level 522 of each storage destination volume 521.

The volume type versus characteristics mapping table 530 is used when the storage destination volume calculation rule setup engine 103 deductively generates the data for the storage destination volume versus characteristics mapping table 510 and storage destination volume usage priority definition table 520 in accordance with the storage destination volume manufacturer and type. The volume type versus characteristics mapping table 530 retains the information about manufacturers 531, volume types 532, reliability characteristics 533, performance characteristics 534, and capacity unit price 535.

Figure 6:
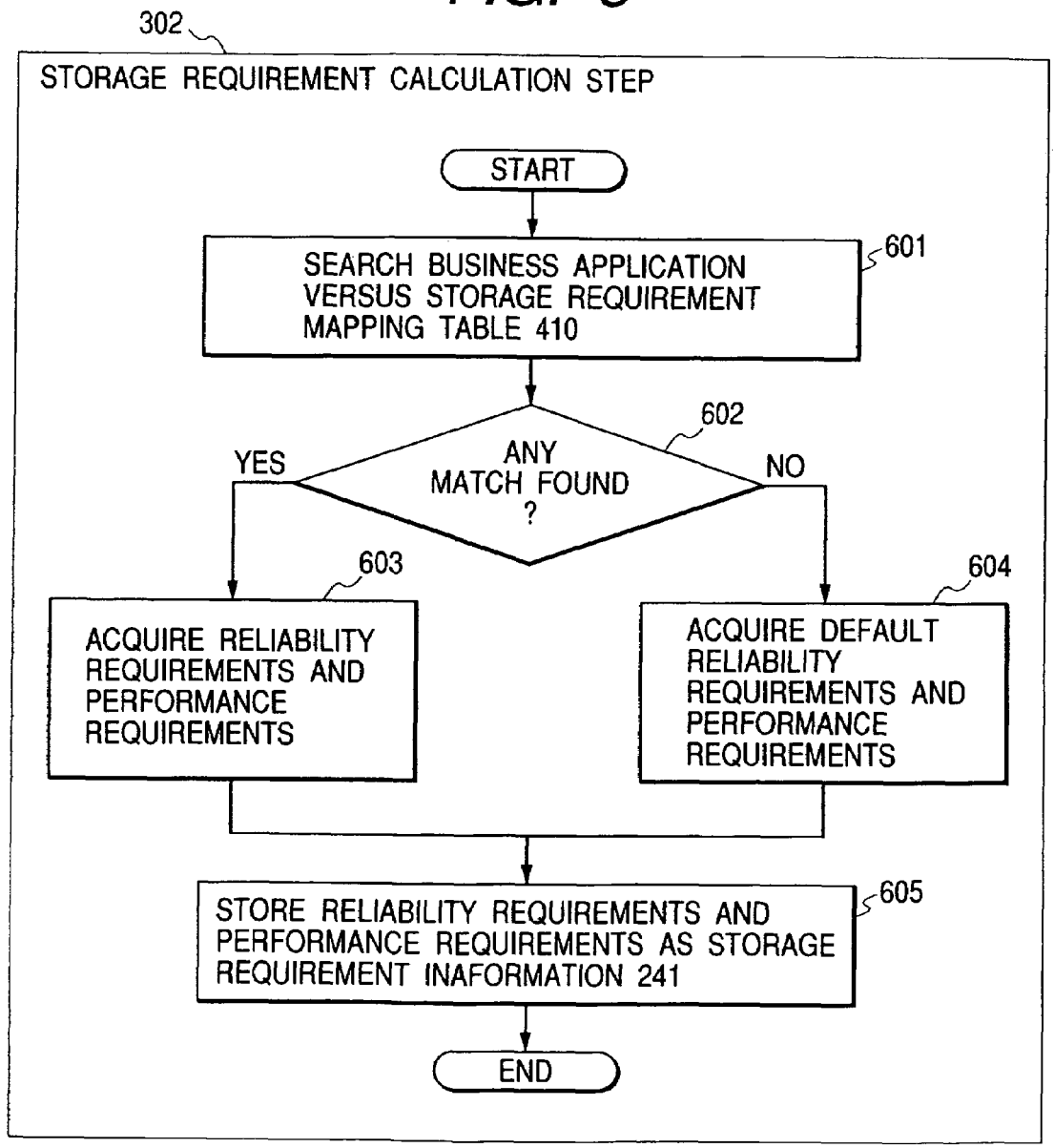
FIG. 6 is a flowchart illustrating the processing steps for storage requirement calculation.

Next, the storage requirement calculation step 302 will be described. FIG. 6 is a flowchart that illustrates how the storage requirement calculation step 302 is performed.

First, the type of the business application that has issued a storage request is used as the key to search the business application versus storage requirement mapping table 410 within the storage requirement calculation rule 181 (step 601). The type of the business application that has issued a storage request can be acquired in various ways. For example, the type possessed by a business application attempting to store data can be set in a storage request instruction parameter to acquire the business application type at the time of storage request instruction decoding or can be made known when an attempt is made to log on to the NAS system for sending a storage request. If the business application versus storage requirement mapping table shown in FIG. 4 consists of user names, reliability requirements, and performance requirements, the user name of a user who issues a storage request is used as the key to search the business application versus storage requirement mapping table.

If a matching record is found in the search conducted in step 601, the program flow proceeds to step 603; however, if no matching record is found, the program flow proceeds to step 604 (step 602). In the former case, the reliability requirements and performance requirements are acquired from the matching record found in step 601 (step 603). In the latter case, on the other hand, the business application that has issued a storage request is not registered; therefore, the business application versus storage requirement mapping table 410 is searched for the default storage requirements to acquire the reliability requirements and performance requirements (step 604).

The reliability requirements and performance requirements acquired in step 603 or 604 are then passed to the storage destination volume calculation step 303 as the storage requirement information 241 (step 605). When step 605 is completed, the reliability requirements and performance requirements retained by the storage requirement information 241 become the reliability requirements and performance requirements for the file requested for storage, which are suitable for the type of the business application that has issued a storage request.

Figure 7:
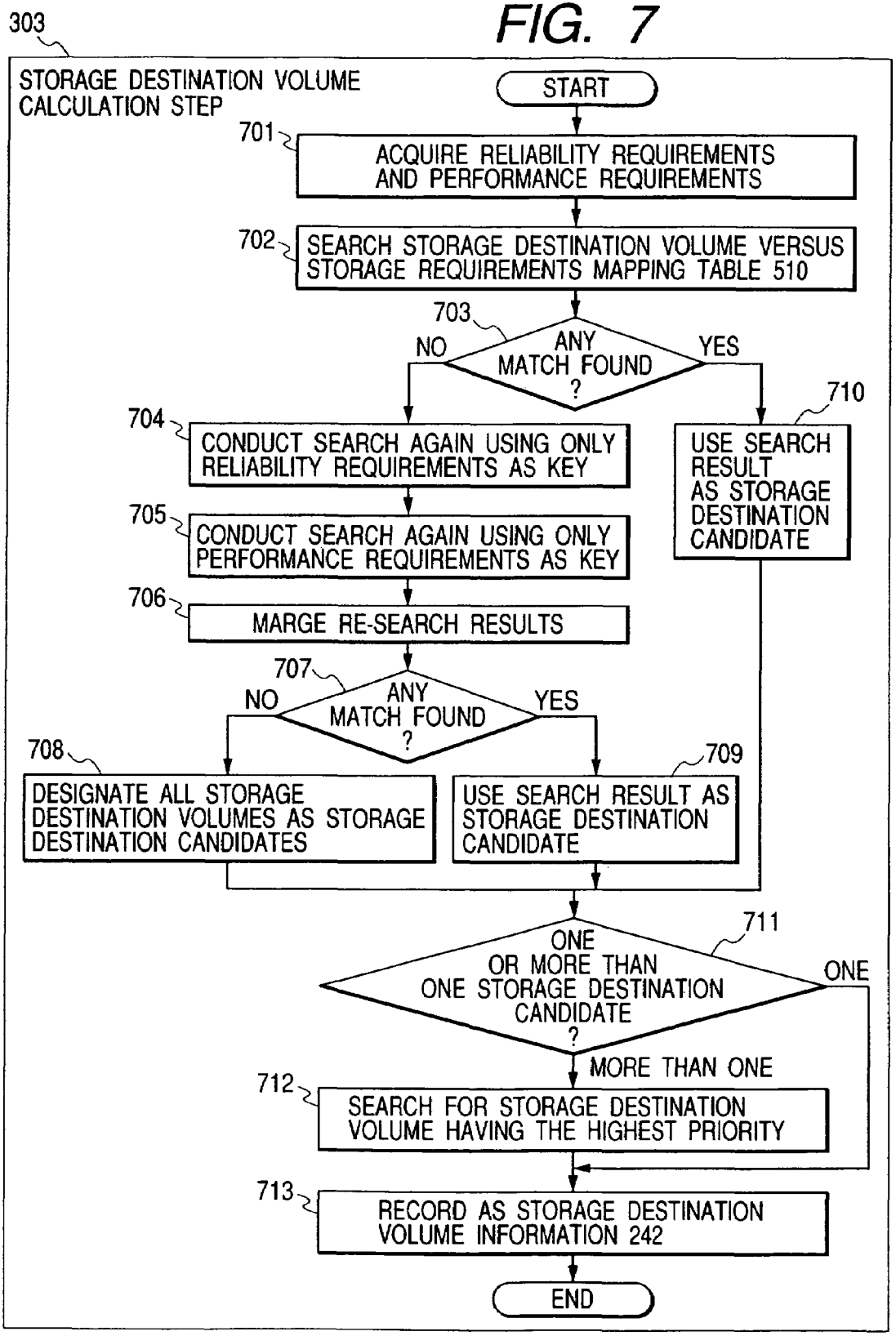
FIG. 7 is a flowchart illustrating the processing steps for storage destination volume calculation.

The storage destination volume calculation step 303 will now be described. FIG. 7 is a flowchart that illustrates how the storage destination volume calculation step 303 is performed.

The storage requirement information 241 calculated in the storage requirement calculation step 302 is referenced to acquire the reliability requirements and performance requirements (step 701). The reliability requirements and performance requirements acquired in step 701 are used as the key to search the storage destination volume versus storage requirement mapping table 510 under the conditions where the two sets of requirements are ANDed (step 702). If any matching record is found in the search conducted in step 702, step 710 is performed next; however, if no matching record is found to be in compliance with the conditions where the two sets of requirements are ANDed, step 704 is performed next (step 703).

Step 710 is performed so as to handle the search result as a storage destination candidate, and then the program flow proceeds to step 711. The search result indicates a storage destination volume appropriate for storing the target file, that is, the storage destination volume that satisfies the reliability requirements and performance requirements.

If no matching record is found to be in compliance with the conditions where the above-mentioned two sets of requirements are ANDed, only the reliability requirements are used as the key to search the storage destination volume versus storage requirement mapping table 510 (step 704).

Only the performance requirements are used as the key to search the storage destination volume versus storage requirement mapping table 510 (step 705). The storage destination records found in the searches in steps 704 and 705 are merged to generate a single search result (step 706).

The search result obtained in step 706 is examined to check for a matching record. The program flow proceeds to step 709 if any matching record is found or proceeds to step 708 if no matching record is found (step 707). If no storage destination volume is found to be compliant with demanded storage requirements when steps 704 through 707 are performed, the program flow searches for a storage destination volume that satisfies either the reliability requirements or performance requirements. Using the search result obtained in step 706 as a storage destination candidate, the program flow proceeds to step 711 (step 709). Since no storage destination volume is found to be compliant with the reliability requirements or performance requirements, the program flow regards all storage destination volumes as storage destination candidates and proceeds to step 711 (step 708).

After checking whether one or more than one storage destination volume candidate is designated in the preceding step, the program flow proceeds to step 713 if only one candidate is designated or proceeds to step 712 if two or more candidates are designated (step 711). Since there are a plurality of storage destination candidates, the program flow references the storage destination volume usage priority definition table 520, and performs calculations on the plurality of storage destination candidates to select a storage destination volume having the highest priority (step 712).

The selected storage destination volume is recorded as the storage destination volume information 242 and then passed to the storage step 304 (step 713). When a plurality of storage destination volumes satisfy the reliability requirements and storage requirements, steps 711 through 713 are followed as described above to perform calculations on such plurality of storage destination volumes to select one specific storage destination volume in accordance with the priority definition formulated in the storage destination volume usage priority definition table 520.

An embodiment of the storage requirement calculation rule setup engine 102 and storage destination volume calculation rule setup engine 103 will now be described.

Figure 8:
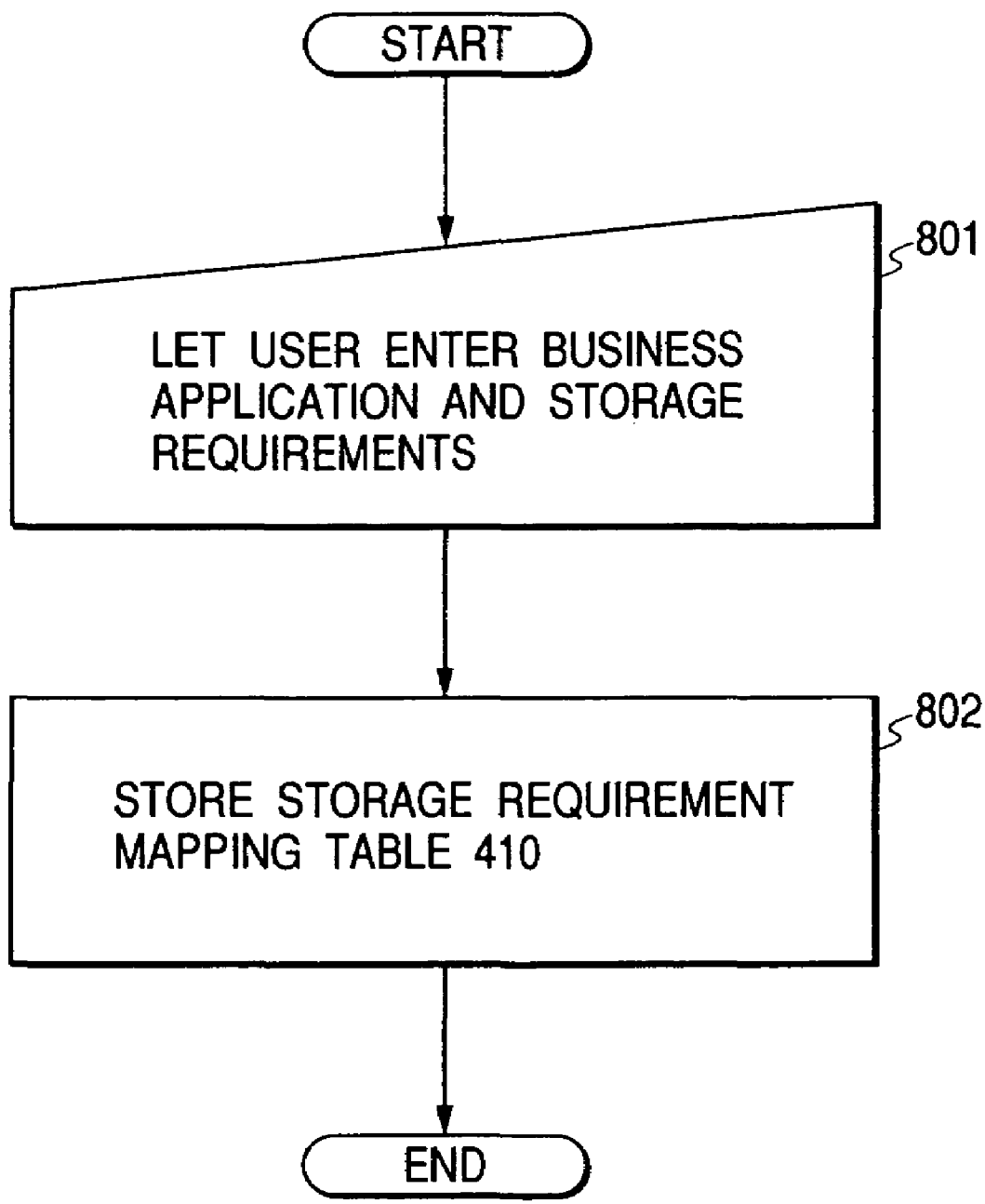
FIG. 8 is a flowchart illustrating the processing steps that are performed by a storage requirement calculation rule setup engine 102.

The storage requirement calculation rule setup engine 102 sets up the storage destination requirement calculation rule 181. FIG. 8 is a flowchart that illustrates an embodiment of the process performed by the storage requirement calculation rule setup engine 102. The process consists of two steps.

First, the user is prompted to manually enter the reliability requirements and performance requirements for the file that a specific business application stores (step 801). Next, the reliability requirements and performance requirements entered in the preceding step are stored in the storage requirement mapping table 410 (step 802). As described above, this embodiment assumes that the user manually sets up the storage destination requirement calculation rule 181.

Alternatively, a business application developer may distribute a setup file to users to present the reliability requirements and performance requirements for the files to be stored by a specific application. In this case, the setup file can be entered into the storage requirement calculation rule setup engine 102 so that the storage requirement calculation rule setup engine 102 interprets the setup file to set up the storage destination requirement calculation rule 181.

The storage destination volume calculation rule setup engine 103 sets up the storage destination volume calculation rule 182.

In the embodiment, the storage destination volume calculation rule setup engine 103 is characterized in that it dynamically calculates the storage destination volume calculation rule 182 in accordance with the manufacturer information and volume type information, which can be obtained by issuing an inquiry command to a storage destination volume.

FIG. 9 illustrates the process that is performed by the storage destination volume calculation rule setup engine 103. The process of the storage destination volume calculation rule setup engine 103 will now be described in detail with reference to FIGS. 9 and 5.

The user enters the reliability characteristics and performance characteristics in accordance with the volume manufacturer and type (step 901). The user has to enter the reliability characteristics and performance characteristics for each volume type. The volume-type-specific reliability characteristics and performance characteristics entered in the preceding step are then stored in the volume type versus characteristics mapping table 530 (step 902). The program flow now clears all the records in the storage destination volume versus characteristics mapping table 510 and storage destination volume usage priority definition table 520 (step 903).

Next, a type inquiry command is issued to all the connected storage destination volumes 171 to acquire the information about their manufacturers and types. The type inquiry command can actually be implemented by using SCSI's inquiry command or the like (step 904). The information about a volume manufacturer and type, which is acquired in the preceding step, is then used as the key to search the volume type versus characteristics mapping table 530 (step 905).

The program flow proceeds to step 907 if a matching record is found in the search conducted in the preceding step; however, if no matching record is found, the program flow proceeds to step 910 (step 906). In the former case, the reliability characteristics and performance characteristics are acquired from the search result (step 907). In the latter case, the default reliability characteristics and performance characteristics in the volume type versus characteristics mapping table 530 are acquired (step 910).

The information about the reliability and performance characteristics and the associated storage destination volume is added to the storage destination volume versus characteristics mapping table 510 as a record (step 908). The record of the same destination volume as for the storage destination volume versus characteristics mapping table 510 is added to the storage destination volume usage priority definition table 520 so as to assign usage priority levels 522 to the definitions in the volume type versus characteristics mapping table 530 in ascending order of capacity unit price 535 (step 909).

The above steps are performed to ensure that a storage destination volume having the lowest capacity unit price is used prior to the others when they satisfy the same storage requirements.

Since the storage destination volume calculation rule setup engine 103 uses the volume type information to automatically calculate the reliability characteristics and performance characteristics of each volume as described above, the user need not take the trouble of defining the storage destination volume characteristics separately.

The present invention is not limited to the above embodiment, but extends to various modifications. In the above embodiment, for example, the storage destination requirement calculation rule 181 shown in FIG. 4 and the storage destination volume calculation rule 182 shown in FIG. 5 calculate the reliability requirements and performance requirements on condition that both of these requirements be met. However, these rules may alternatively perform calculations on condition that either the reliability requirements or performance requirements be met. Some business applications do not always require that the reliability requirements and performance requirements be both met. For such business applications, the storage requirements can be defined with relative simplicity.

The system of the embodiment makes it possible to achieve data storage destination optimization on an individual file basis because it calculates the storage requirements and selects a storage destination volume for each file. Further, it automatically selects the storage destination volume in the storage requirement calculation step and storage destination volume selection step, thereby saving the administrator the bother of performing a complicated setup procedure while considering individual volumes and their mounting destinations. As a result, the administrator of a storage system can accomplish data storage destination optimization on an individual file basis without having to perform a complicated setup procedure.

What is claimed is:

1. A file server system for storing file data upon request from clients having a plurality of business applications, said system comprising:

a storage device including a plurality of volumes for storing data to be requested by clients;

a main storage device configured to store an OS for operating the system and retain a storage destination selection engine for making a storage destination volume selection for each file in compliance with a storage request from a business application running on a client, a storage requirement calculation rule setup engine configured to set up a storage destination requirement calculation rule, and a storage destination volume selection rule setup engine configured to set up a storage destination volume selection rule; and a CPU configured to execute, under the OS, the storage destination selection engine, the storage requirement calculation rule setup engine, and the storage destination volume selection rule setup engine, calculate storage requirements for each file, and select a file data storage destination volume, wherein said storage destination selection engine executes inquiring of each volume a volume type information, using the volume type information derived from the inquiry as the key to search for the predefined information about a relationship between the volume type information and the reliability characteristics and performance characteristics of each volume, calculating the reliability characteristics and performance characteristics of each volume, and calculating, upon a file storage request, a storage destination volume by referring to said calculated reliability characteristics and performance characteristics of each volume and the storage requirements for the file requested for storage.

* * * * *